United States Patent [19]
Zepeda-Castillo

[11] 3,928,121
[45] Dec. 23, 1975

[54] PROCESS FOR THE OBTENTION OF FERMENTABLE POWDERED SYRUP AND ALPHACELLULOSE FROM XEROPHYTE PLANTS

[76] Inventor: Enrique Zepeda-Castillo, Juan Bernardino 249, Guadalajara 5, Jal., Mexico

[22] Filed: Oct. 23, 1974

[21] Appl. No.: 517,575

[30] Foreign Application Priority Data

Oct. 23, 1973  Mexico .................................. 146945

[52] U.S. Cl. ...................... 162/14; 127/37; 162/96; 162/99; 426/431; 426/456
[51] Int. Cl.² ... D21C 3/00; D21C 5/00; A23L 1/28; A23L 2/08; A23L 2/30
[58] Field of Search .......... 162/14, 99, 96; 426/456, 426/366, 431; 127/37

[56] References Cited
UNITED STATES PATENTS

| | | | |
|---|---|---|---|
| 1,358,898 | 11/1920 | Tomlinson ............................ | 127/37 |
| 1,918,250 | 7/1933 | De la Roza ........................ | 162/96 X |
| 1,918,558 | 7/1933 | Plant ................................ | 162/99 X |
| 2,222,885 | 11/1940 | Thomsen ............................. | 127/37 |
| 2,295,215 | 9/1942 | Joachim .............................. | 162/96 |
| 2,731,345 | 1/1956 | Jen ..................................... | 162/96 X |
| 2,801,939 | 8/1957 | Hignett et al. ....................... | 127/37 |
| 3,051,611 | 8/1962 | Falcon ............................... | 162/96 X |
| 3,479,248 | 11/1969 | Nobile .............................. | 127/37 X |
| 3,640,768 | 2/1972 | Eickemeyer ......................... | 127/37 |

*Primary Examiner*—S. Leon Bashore
*Assistant Examiner*—Arthur L. Corbin
*Attorney, Agent, or Firm*—Sughrue, Rothwell, Mion, Zinn & Macpeak

[57] ABSTRACT

A process for the obtention of fermentable powdered syrup and alpha-cellulose from xerophyte plants, particularly of the genus Amarillidaceae, such as Agave, comprises separately removing the plant material consisting of the leaf portions and the core portions of the plant; admixing and washing with water said plant material; chopping the washed plant material to form small pieces separating the plant material from its juices; subjecting the chopped material to an extraction process with an aqueous liquor expressing the residual solid plant material to expel the remaining enriched extractant therefrom; hydrolyzing the plant material from the expression step with water; further expressing said plant material to expel a hydrolysis liquor; admixing the plant juice and enriched extractant to obtain a mixed juice; settling and clarifying said mixed juices; heating the clarified mixed juices; concentrating the heated juice by evaporation; and spray drying the concentrated juice or syrup to obtain a fermentable powdered syrup suitable for further fermentation and distillation to manufacture alcoholic liquors such as "tequila"; and digesting the plant material from said further expression to obtain a pulp; washing and bleaching the thus obtained cellulose pulp; and again washing, expressing, drying and screening the pulp to obtain an alpha-cellulose.

10 Claims, 1 Drawing Figure

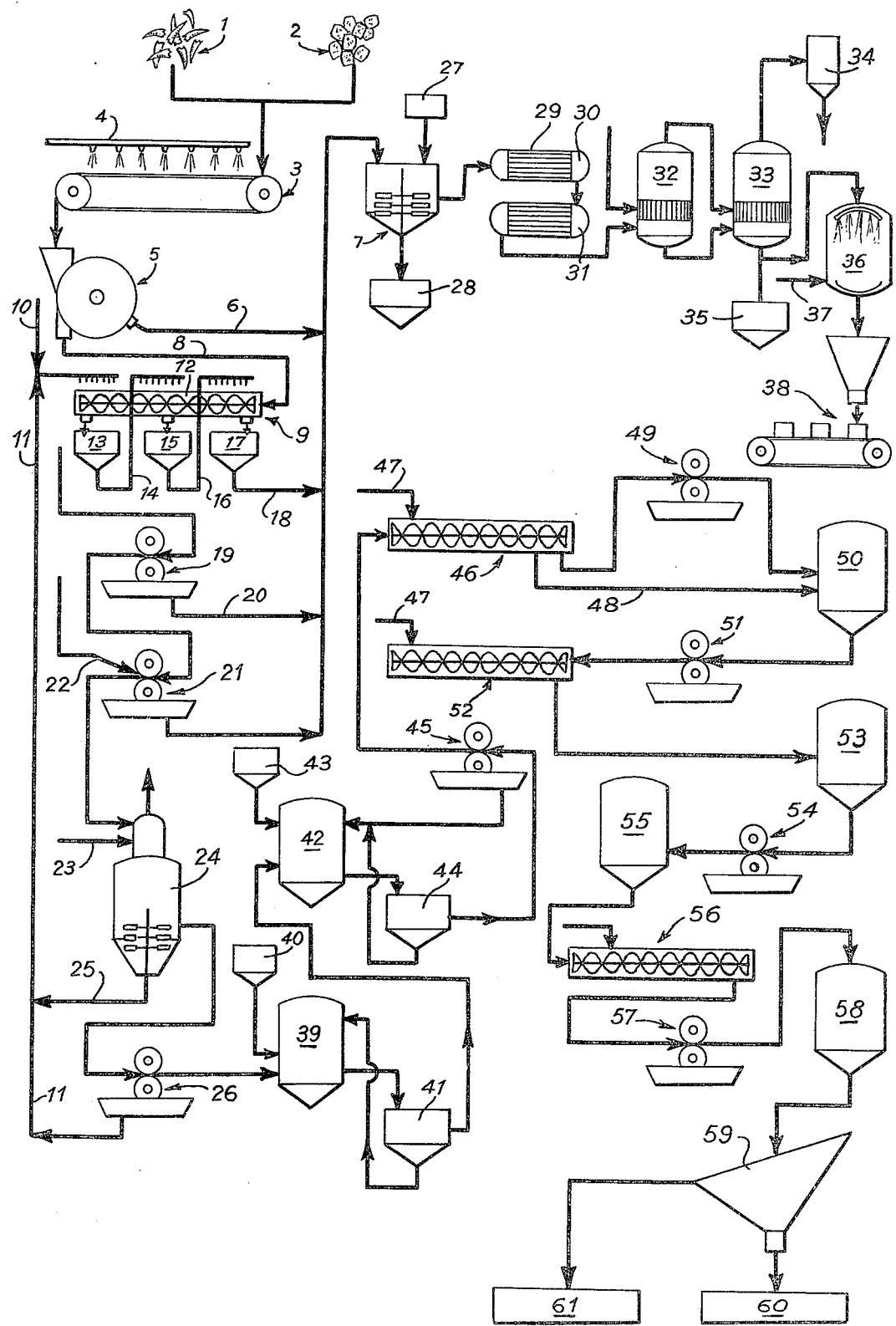

PROCESS FOR THE OBTENTION OF FERMENTABLE POWDERED SYRUP AND ALPHACELLULOSE FROM XEROPHYTE PLANTS

BACKGROUND OF THE INVENTION

The present invention refers to a process for the preparation of fermentable powdered syrup and alpha-cellulose from whole raw xerophyte plants and, more particularly, it is related to a process for the obtention of fermentable powdered syrups and alpha-cellulose from raw xerophyte plants without having resource to the traditional coction or cooking process, in order to supply a high quality cellulose product and a syrup suitable to be dried in order to produce a highly stable fermentable powder.

As it is well known, in the conventional process used for many years to manufacture distilled liquors of the type of "tequila" from the fermented juices of xerophyte plants, particularly of the genus Agave, such as Agave tequilana, it was mandatory to subject only the core portions of the Agave plant to an intensive coction at high temperatures and pressures in order to break down the cellulosic walls of the plant material for the purpose of facilitating the removal of the juices contained therein by means of a suitable expelling process. This coction step generates substantial amounts of partially carbonized matter which is entrained in a colloidal state and which considerably affects the quality of the liquor expressed and, on the other hand, it also produces serious scorching, decoloration, impurification and hardening of the fibrous material, whereby said material can be considered as practically unuseful for the obtention of good quality fibers and cellulose.

Despite the very important drawbacks introduced in the process of treating xerophyte plants by the coction stage which has been considered indispensable heretofore, the manufacturers of alchololic liquors of the above mentioned type have not been able to avoid the use of the said coction step, inasmuch as otherwise it was not possible to achieve the complete extraction of the juices contained in the plant material for further treatment by fermentation and distillation to obtain said liquors.

Therefore, before the advent of the present invention, it was considered impossible to obtain alpha-cellulose from the fibrous material of xerophyte plants treated by the conventional coction process, as said treatment completely spoiled the fibrous portion of the xerophyte plant beyond any possibility of regeneration to obtain an alpha-cellulose of suitable quality, inasmuch as, besides the impurities introduced by the coction step, the alpha-cellulose contained in the plant material was converted to a large extent into beta-cellulose and gamma-cellulose, whereby it was only possible to obtain mixtures thereof.

For the same reason, in the prior art processes for the obtention of distilled alcholic liquors from fermented juices of xerophyte plants, particularly of the genus Agave, it was considered impossible to obtain a highly concentrated and pure syrup which could be subjected to a suitable drying step, whereby the possibilities of locating a plant for manufacturing distilled liquors are restricted by economical considerations only to those zones which are in the neighborhood of the regions in which said xerophyte plants are grown, as transportation of the whole plants to remote locations is absolutely antieconomical, whereas, on the other hand, the transportation of liquid syrups cannot be effected because said syrups are highly unstable, whereby they suffer autogenous fermentation in relatively short periods of time, which prevents its massive transportation at long distances, and this besides the disadvantage of having to transport large amounts of water as are contained in said syrups.

Therefore, the need of a suitable process to obtain fermentable juices of high quality, capable of being furtherly processed to obtain highly stable powdered syrups without the use of the conventional coction step, to produce an unchanged fibrous pulp from which high quality fibers and alpha-cellulose of suitable grade could be obtained for textile uses or for the manufacture of gels, has been for long extant in this industrial field and has prevented the integration of a highly profitable industry which, inter alia, could produce a raw material easily transportable at long distances for its utilization in liquor distilleries remote from the intensive culture areas of xerophyte plants.

The attempts heretofore effected to try to solve the above described problem, however, have been fruitless, inasmuch as, without abandoning the undesirable coction step, generally effected for prolonged periods of time and at unduly high temperatures and pressures, it was impossible to use the thus cooked plant material for the obtention of juices suitable to be converted into a powder, or for the obtention of cellulosic fibers of suitable quality for its further processing for the production of a high quality alpha-cellulose. Also, while some attempts have been effected to use the pulpy leafs of the xerophyte plants together with the core material for the production of fibers, these attempts resulted in the sacrifice of material useful for the obtention of fermentable juices, hence said attempts resulted in the obtention of low profitable processes.

BRIEF SUMMARY OF THE INVENTION

Having in mind the defects of the prior art processes for processing xerophyte plants, the present invention provides a process for the obtention of fermentable powdered syrups and alpha-cellulose from the whole xerophyte plant material, which will overcome all the disadvantages of the prior art processes and will at the same time be of a highly economical performance.

The present invention also provides a process of the above mentioned character, which will use the uncooked xerophyte plant material for the obtention of powdered syrups and cellulose, without the need of carrying out a coction or cooking treatment of said plant material.

The present invention further provides a process for the preparation of fermentable powdered syrups from xerophyte plants, of the above character, in which both the leaf and the core portions of said plants will be fully processed without the need of any coction thereof.

This invention also provides a process for the preparation of a high quality alpha-cellulose from xerophyte plants, of the above mentioned character, in which the fibrous portions of both the leaf and the core portions of said plants will be fully processed without causing any damage to said fibrous portions prior to processing the same.

The present invention furtherly provides a process of the above mentioned character, which will be of a very simple and highly efficient performance and which will also furnish products of high quality of stability.

This invention more particularly provides a process of the above mentioned charactr, which will provide for the obtention of a mixed juice of suitable quality and purity to permit its further processing to obtain fermentable highly concentrated syrups and powdered syrups.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of specific embodiments, when read in connection with the accompanying drawing, in which:

The single FIGURE is a schematical flow-sheet of the process for the obtention of fermentable powdered syrup and alpha-cellulose from the combined leaf portions and core portions of raw xerophyte plants, illustrating in detail a particularly preferred embodiment in accordance with the present invention.

DETAILED DESCRIPTION

Having now more particular reference to the drawing, the process of the present invention will be described in terms of a particularly preferred embodiment thereof illustratively represented in said drawing, without intending to restrict the scope of the invention to said embodiment, inasmuch as certain steps of the process can be varied within the skillfulness of any expert chemist, without thereby departing from the true scope and spirit of the present invention.

While any type of xerophyte plant can be subjected to the process which will be described in detail hereinbelow upon introducing irrelevant modifications in the different steps thereof, the present invention will best be understood by having reference to a preferred illustrative example in which a xerophyte plant of the genus Amarillidaceae, such as Agave tequilana or Agave americana is used, said plants normally containing 62 to 63% by weight of core material, 30 to 32% by weight of pulpy leafs, 2 to 3% of stalk material and 2 to 6% of root material.

The whole of the core portion and the leaf portion of this type of plants is used, namely, a total of about from 92 to 95% of the whole plant material, whereby, upon cutting the plants, said leaf material and said core material are removed from the remainder and are separately stored, such as illustrated at 1 and 2 in the drawing, and suitable proportions of each of said plant materials are fed to the process in order to maintain the proper Brix value of the mixed juice, within suitable preestablished limits.

The mixture of cores and leafs of the xerophyte plants are fed to a washing section 3 wherein the plant material is subjected to an energetic water spray fed through line 4 in order to thoroughly wash the surface of said plant material to remove any foreign matter which might affect the performance of the following steps of the process of the present invention.

The xerophyte plant material, suitably washed, is then chopped by hand or in a suitable mechanical chopper 5, to from pieces of a suitable small size, preferably of from 1 to 3 cm long, 0.5 to 1.5 cm wide and 0.3 to 0.8 cm thick, and more particularly to form pieces of approximate dimensions of 2 × 1 × 0.5 cm, inasmuch as it has been found that the sizes between the above mentioned limits show the best results in the extraction or diffusion process of the present invention which will be described in more detail hereinbelow, which substitutes the traditional coction operation to break down the cellulosic walls of the plant material considered necessary in accordance with the prior art.

The plant juices and the chopped plant material are separated from one another by releasing the juices from the chopped xerophyte plant material and conveying the juices by a suitable line 6 to a mixed juice tank 7 and passing the chopped material by suitable conveyor means 8 to a diffuser or extractor 9 where it is subjected to an extraction process with an aqueous extractant liquor, in order to extract the solids dissolved in the water contained in said chopped plant material.

While the extraction or diffusion process mentioned above can be effected by using pure water fed through line 10 at a temperature preferably between 85° and 92°C., it is generally preferred to use the aqueous liquid of line 11, obtained from the step of pre-hydrolysis of the cellulosic material, which will be described more fully hereinbelow, inasmuch as this aqueous liquor already contains small amounts of dissolved materials, whereby a more complete stripping of the cellulosic plant material is achieved by the utilization of the thus formed diluted liquor for the extraction or diffusion step of the process of the present invention. When the pre-hydrolysis liquor is not produced in amounts sufficient to replenish the necessary volumes of extractant for the extraction operation, then said amounts are completed with said water at a temperature of from 85° to 92°C. as mentioned above, as well as steam in amounts such that the temperatures is maintained within the above mentioned limits.

It will be clearly apparent to any one skilled in the art that the extraction process of the present invention can be effected by many suitable means, inasmuch as the said process is based on solvent extraction techniques in a binary or ternary system, depending on the number of phases in the system. The compounds of the mixture are separated by virtue of its distribution into two mutually insoluble phases, namely, a liquid phase which comprises the natural moisture of the xerophyte plant material containing the saccarides or carbohydrates which are to be extracted, and a solid phase comprising the fiber which serves as a support for the juice. As the solvent which is used in this operation is selected from water, pre-hydrolysis liquor or mixtures thereof at a temperature of between 85°C. to 92°C., the extraction system of the present invention is obviously a ternary system accompanied by impurities such as small amounts of glucose, proteins, waxes, gums and other impurifying substances, and in which a pair of partially miscible liquid phases are formed, wherein the dissolved solid material in one of the liquid phases, the moisture of the plant, passes to the other liquid phase, that is, the extractant or solvent, in view of the temperature difference between both phases. It is on account of said reason that the above mentioned temperature range is highly critical in order to achieve a suitable extraction by means of a system which can be deviced by any expert in the art, but which is preferably a so called extraction system by composite imbibition.

In the preferred extraction system which is used in accordance with the present invention, it is preferred to feed the chopped plant material through the inlet end of an elongated conveyor 12, in which said chopped plant material is continuously conveyed while at the outlet end of the conveyor the extractant (10, 11) is fed at the prescribed temperature. A first extractant tap is provided, such as at 13, at said outlet end of the conveyor, and the partially enriched extractant is reintroduced into the conveyor at the intermediate portion thereof through line 14, the operation being repeated by tapping the increasingly enriched extractant from the intermediate tap section 15, to be reintroduced through line 16 into the inlet end of the conveyor, whence the juice produced by the extraction operation is removed through the tap section 17, in order to feed the same to the mixed juice tank 7 through line 18, together with the juice received from the chopping step 5.

The plant material stripped in the extraction step, even when the extraction or diffusion operation is of a high efficiency when effected in accordance with the above, still tends to retain certain amounts of juice, whereby it is preferably expressed in an expeller 19 to mechanically remove the remainder of the juice from the material, said expelled juice being also introduced into the mixed juice tank 7 through line 20.

The above described steps practically remove the whole of the soluble substances from the xerophyte plant material, whereby the process of the present invention achieves the production of a bagasse which, by virtue of not having suffered the effects of a prolonged coction at elevated temperatures, furnishes a raw fibrous material highly suitable to be used in the production of cellulose.

While the expression of the material from the extraction step can be effected in a single stage, it is preferred to use two expellers 19 and 21, with the introduction of suitable amounts of water through line 22 between the first and the second expellers, in order to thereby effect in the first expeller 19 a complete recovery of the juice retained by the fibers, while in the second expeller 21, in view of the introduction of water 22, the soluble solids which may have remained in the plant material are completely extracted, said operation being more efficiently effected by the incorporation of said water at a temperature of from about 80°C. to 85°C. upstream from said second expeller. As mentioned above, all of these recovered juices are also introduced into the mixed juice tank for further processing in order to obtain a fermentable powdered syrup in accordance with what will be described in more detail hereinbelow.

The expressed bagasse, containing about 50% moisture, is treated with water fed through line 23 in a hydrolizer 24, in order to effect a pre-hydrolysis at a temperature of about from 100°C. to 120°C., preferably 110°C., under a vapor pressure corresponding to this temperature, in a solid-to-liquid ratio of about 1:2 on a dry basis. For this pre-hydrolysis treatment of the cellulosic or fibrous material, it is preferred to use as the sole reactant fresh water free from carbonates and calcium, for a residence time of the material in the hydrolizer 24 of from about 1.5 to 3 hours, with continuous stirring. The pre-hydrolysis liquor thus obtained, which has fully extracted the soluble solids from the cellulosic material, is carried through line 25 and used as the extractant in the extraction step as mentioned above, either alone or admixed with water at the above described critical temperature. Obviously, the cellulosic material is then subjected to an expression step 26 at the outlet of the hydrolizer 24, in order to recover as much as posssible of the juice therefrom, which is also incorporated into the extractant line 11. The thus obtained spent cellulosic material is subjected to a suitable treatment for the obtention of high quality alpha-cellulose, which treatment can be of any nature but preferably is effected in accordance with what will be described in detail hereinafter.

The juices from the chopping step 5, the extraction or diffusion step 9, the expression step 19 and the expression step 21, are mixed and settled in tank 7 in order to remove any undissolved solid material which could contaminate the same and if desired, are clarified by means of any suitable technique such as the addition of a flocculant from a flocculant feeder 27, and are filtered to remove the bagasse contained therein. The flocculated proteins, gums and resins may be stored in a tank 28 for further processing or disposal.

The settled, clarified and filtered mixed juice, at a temperature of about 25° to 35°C., preferably 30°C., is subjected to a preheating step 29 to raise its temperature to about 100°C. This preheating step, while of any desired nature, is preferably effected in two stages, the first of which (preheater 30), raises the temperature to about 60°C. and the second of which (preheater 31), raises said temperature to about 100°C. The preheating effected in two stages is considered to be preferable in order to prevent any decrease in the flow rate of the juice with the consequent formation of a bottleneck in the process. However, this preheating step can be perfectly effected in a single stage by the appropriate selection of the heating area of the heat exchanger.

The preheated juice is fed to a multiple effect evaporator system, which preferably comprises two effects 32 and 33 and a condenser 34, the preheated juice being received in the first effect 32 with a Brix value of about 10.3 which is raised to about 80° Brix at the outlet of the second effect 33. The concentrated juice or syrup can be stored in a tank 35 to be directly used in distilleries, upon dilution thereof to be fermented and distilled for the production of a liquor of the type of "tequila". In accordance with the process of the present invention, however, inasmuch as the concentrated syrup thus obtained possesses suitable properties, said syrup is subjected to a spray drying step 36, by means of hot air or gas 37, whereby a fermentable powdered syrup of xerophyte plants is obtained, which is a highly stable product capable of being packed in a packing section such as illustrated at 38 and transported to distilleries located in remote places, without any alteration and with said powder preserving its properties to be thereafter subjected, upon rehydration thereof, to the fermentation and distillation processes traditionally used for the obtention of distilled alcholic liquors.

It has been experimentally determined that the fermentable powdered syrup obtained by the process of the present invention can be maintained unaltered upon suitable packing and storage thereof in air-proof closed vessels, in order to avoid the development of the hygroscopic tendencies of the material for indefinitely long periods of time. A stability test effected with a powdered syrup, stored in an open vessel, however, showed that it returned to the liquid state was petrified only after 6 months of storage, but without any adverse effect on its properties, which is indicative of the high stability of the powdered syrup and of its indefinite duration without any loss of useful properties if the same is packed in air-proof reservoirs.

On the other hand, the cellulosic material furnished by the expression step 26, is subjected to a first digestion by cooking the material in a digester 39, with a solution stored in feeder tank 40, of about 6% sodium hydroxide, 18% sodium sulfite and 1% sodium carbonate, at a temperature of from about 170°C. to 180°C., and under a pressure of from 7 to 8 kg/cm$^2$, for a period of time of about 4 hours. The cooked mass or pulp is subjected to a separation step in a settler 41 in order to recover the liquor so as to effect the adjustment of unused reactants, whereas the solid pulp is subjected to a second digestion in a digester 42, by cooking the same with a solution stored in feeder tank 43, of about 2% sodium hydroxide and 10% sodium sulfite, at a temperature of from about 170°C. to 180°C. and under a pressure of from 7 to 8 kg/cm$^2$, for a period of time of about 2 hours. This second digestion exerts a less violent attack than the first digestion, and has as its aim to complete the rupture of the cellular walls of the fibroligneous vessels which were not sufficiently attacked by the first digestion and which are generally located in the joint between the leafs and the cores of the xerophyte plant.

The material from the second digester is subjected to a separation process in a settler 44 in order to recover the liquor for the adjustment of unused reactants and the solid material is subjected to an expression step 25, the expelled liquor being recycled again for the adjustment of reactants together with the liquor of said second digestion.

The material is then washed in a washer 46 with water fed at 47, in order to remove the residual caustic and sulfite, until the neutral pH of 7.0 is obtained. The entrained fines are sent through line 48 to the first bleaching step 50 which will be described hereinbelow and the remaining material is subjected to an expression step 49 and is sent to the bleacher 50.

The expressed material is bleached for about one hour preferably with chlorine gas and chlorine water. The material is then expressed in an expeller 51 and again washed in a washer 52 similar to the above. The washed material is subjected to a second bleaching step in a bleacher 53 for about 1 hour with sodium hydroxide. The material is again expressed in the expeller 54 and is subjected to a third bleaching step in the bleacher 55 with calcium hypochlorite, for a period of time of about 3 hours.

Finally, the bleached material is washed in the washer 56, expressed in the expeller 57 and dried, preferably in a flash type drier 58, to obtain a highly pure alpha-cellulose which is then sifted, for instance, on a sieve 59 in order to separate fine particles useful to manufacture plastic gels, which are stored at 60, and large particles of suitable quality for textile applications, which are stored at 61.

It will thus be seen that for the first time a process has been deviced that avoids any type of coction stages when processing xerophyte plants, whereby a very important source of raw material for cellulose production, which was considered as unuseful in accordance with the prior art, has been now provided, said process being such that the coction step which spoiled the cellulosic material of the plant beyond remedy has been now rendered unnecessary. The pre-treatment of a xerophyte plant to obtain a perfectly unaltered and clean fibrous material, enables further processing thereof for the obtention of a high quality cellulose, which was considered impossible in accordance with the processes of the prior art.

Also, the treatmennt of the raw xerophyte plants, that is, without any coction, produces a highly pure juice which permits its evaporation to high concentrations which were heretofore considered impossible, whereby the drying of the highly concentrated syrups thus obtained is also made possible, as is the production of a powdered syrup which is highly stable when packed in air-proof reservoirs to avoid the development of the hygroscopic characteristics thereof. This obviously furnishes for the first time a product which can be handled, transported and stored for indefinitely long periods of time, thus permitting its further use in the production of fermentable syrups for the obtention of distilled liquors of the type of "tequila", which constitutes a very important technological breakthrough in this particular field.

Although certain specific embodiments of the invention have been shown and described, it is to be understood that many modifications thereof are possible. The invention, therefore, is not to be restricted except insofar as is necessitated by the prior art and by the spirit of the appended claims.

I claim:

1. A process for the obtention of fermentable powdered syrup and alpha-cellulose from xerophyte plants which comprises: washing the mixed leaf and core material of said plants; chopping the washed plant material to form pieces of a relatively small size and a relatively small amount of plant juice; separating the chopped plant material from the plant juice; extracting the chopped material with an aqueous extractant at a temperature of between 85° and 92°C. to produce an enriched extractant; expressing the extracted residual solid plant material to expel the remaining enriched extractant; hydrolyzing said residual solid plant material by treatment with water at a temperature of about 100°C. to 120°C.; expressing the hydrolyzed plant material to expel a hydrolysis liquor to be incorporated into said aqueous extractant; admixing said plant juice and said enriched extractant in order to obtain a mixed juice and subjecting the residual solid plant material to digestion, bleaching, washing, drying and sifting to obtain alpha-cellulose; settling, clarifying and filtering said mixed juice to remove the impurifying solids; heating the juice to a temperature of about 100°C.; concentrating said juice by evaporation to produce a juice having a Brix degree of about 80, whereby a highly concentrated syrup is obtained; and drying said syrup to obtain a fermentable powdered syrup which is hygroscopic, but highly stable when packed in air-proof reservoirs.

2. A process according to claim 1 wherein said washed plant material is chopped to obtain particles having approximate dimensions of from 1 to 3 cm long, 0.5 to 1.5 cm wide and 0.3 to 0.8 cm thick preferably of dimensions of about 2 × 1 × 0.5 cm.

3. A process for the obtention of fermentable powdered syrup and alpha-cellulose from xerophyte plants according to claim 2 wherein said chopped plant material is extracted by a method comprising the steps of: feeding said chopped plant material into one end of an extraction zone; feeding an aqueous liquor through the opposite end of said extraction zone; continuously moving the chopped material in contact with said aqueous liquor; recycling said aqueous liquor upon passage thereof through at least a portion of the chopped material to the intermediate region of said extraction zone; again recycling said aqueous liquor to the zone adjacent said one end of the extraction zone; and discharging the enriched aqueous liquor through said one end, while the spent chopped material is discharged through said opposite end of the extraction zone.

4. A process according to claim 3 wherein said aqueous liquor used in the extraction zone is selected from the group consisting of fresh water, liquor from said hydrolysis step and mixtures thereof.

5. A process according to claim 1 wherein the expression of said extracted residual plant material is effected in two stages, namely, a first expression stage to recover the enriched extractant retained by the fiber and a second expression stage wherein water is used to dissolve and extract the soluble solid materials retained in the fibrous matrix of the plant material.

6. A process according to claim 5 wherein the water introduced to said second expression stage for the partially expressed plant material is fed at a temperature of from about 80° to 85°C.

7. A process according to claim 1 wherein said hydrolysis of said residual solid plant material is effected under a superatmospheric pressure and with continuous stirring of the plant material for a period of time of from about 1.5 to 3 hours.

8. A process according to claim 1 wherein the digestion of said spent cellulosic material is effected in two stages, namely, a first energetic digestion step for a period of time of about 4 hours in the presence of a solution of sodium hydroxide, sodium sulfite and sodium carbonate and a second moderate digestion step for a period of time of about 2 hours in the presence of a solution of sodium hydroxide and sodium sulfite, both digestion steps effected at a temperature of from about 170° to 180°C. and under a pressure of from about 7 to 8 kg/cm².

9. A process according to claim 8 wherein said first digestion step is effected in the presence of an aqueous solution of about 6% sodium hydroxide, aabout 18% sodium sulfite and about 1% sodium carbonate, said second digestion step being effected in the presence of an aqueous solution of about 2% sodium hydroxide and about 10% sodium sulfite.

10. A process according to claim 1 wherein the bleaching of said digested cellulosic material is effected in three stages, namely, a first bleaching stage by treatment with chlorine gas and chlorine water for a period of time of about 1 hour, a second bleaching stage by treatment with sodium hydroxide for a period of time of about 1 hour and a third bleaching stage by treatment with calcium hypochlorite for a period of time of about 3 hours.

* * * * *